United States Patent
Lee et al.

(10) Patent No.: US 10,402,325 B2
(45) Date of Patent: Sep. 3, 2019

(54) MEMORY SYSTEM

(71) Applicants: SK hynix Inc., Icheon-si Gyeonggi-do (KR); Korea University Research and Business Foundation, Seoul (KR)

(72) Inventors: Ho-Kyoon Lee, Icheon-si (KR); Il Park, Icheon-si (KR); Seon-Wook Kim, Namyangju-si (KR)

(73) Assignees: SK hynix Inc., Icheon-si, Gyeonggi-do (KR); Korea University Research and Business Foundation, Seoul (KR)

( * ) Notice: Subject to any disclaimer, the term of this patent is extended or adjusted under 35 U.S.C. 154(b) by 305 days.

(21) Appl. No.: 15/343,417

(22) Filed: Nov. 4, 2016

(65) Prior Publication Data
US 2017/0185513 A1 Jun. 29, 2017

(30) Foreign Application Priority Data

Dec. 23, 2015 (KR) ........................ 10-2015-0185001

(51) Int. Cl.
*G06F 12/0811* (2016.01)
(52) U.S. Cl.
CPC .... *G06F 12/0811* (2013.01); *G06F 2212/283* (2013.01)
(58) Field of Classification Search
CPC ................................................ G06F 12/00–16
See application file for complete search history.

(56) References Cited

U.S. PATENT DOCUMENTS

| 5,249,282 A | 9/1993 | Segers | |
|---|---|---|---|
| 6,029,224 A * | 2/2000 | Asthana | G06F 12/0607 710/119 |
| 8,825,957 B2 | 9/2014 | Benhase et al. | |
| 2001/0049772 A1* | 12/2001 | Choi | G06F 12/0882 711/138 |
| 2003/0028746 A1* | 2/2003 | Durrant | G06F 11/1666 711/206 |
| 2004/0139282 A1* | 7/2004 | Yoshioka | G06F 12/0238 711/133 |

* cited by examiner

*Primary Examiner* — Nicholas J Simonetti
(74) *Attorney, Agent, or Firm* — William Park & Associates Ltd.

(57) ABSTRACT

A memory system may include a first cache memory including a plurality of regions, which are accessed using a first address, and in each of which an indication of whether cached data is present and a second address are stored. A memory system may also include a second cache memory configured to be accessed using the second address stored in an accessed region of the first cache memory when, as a result of an access of the first cache memory, cached data is present. Still further, a memory system may include a main memory configured to be accessed using the first address when, as the result of the access of the first cache memory, cached data is not present.

17 Claims, 6 Drawing Sheets

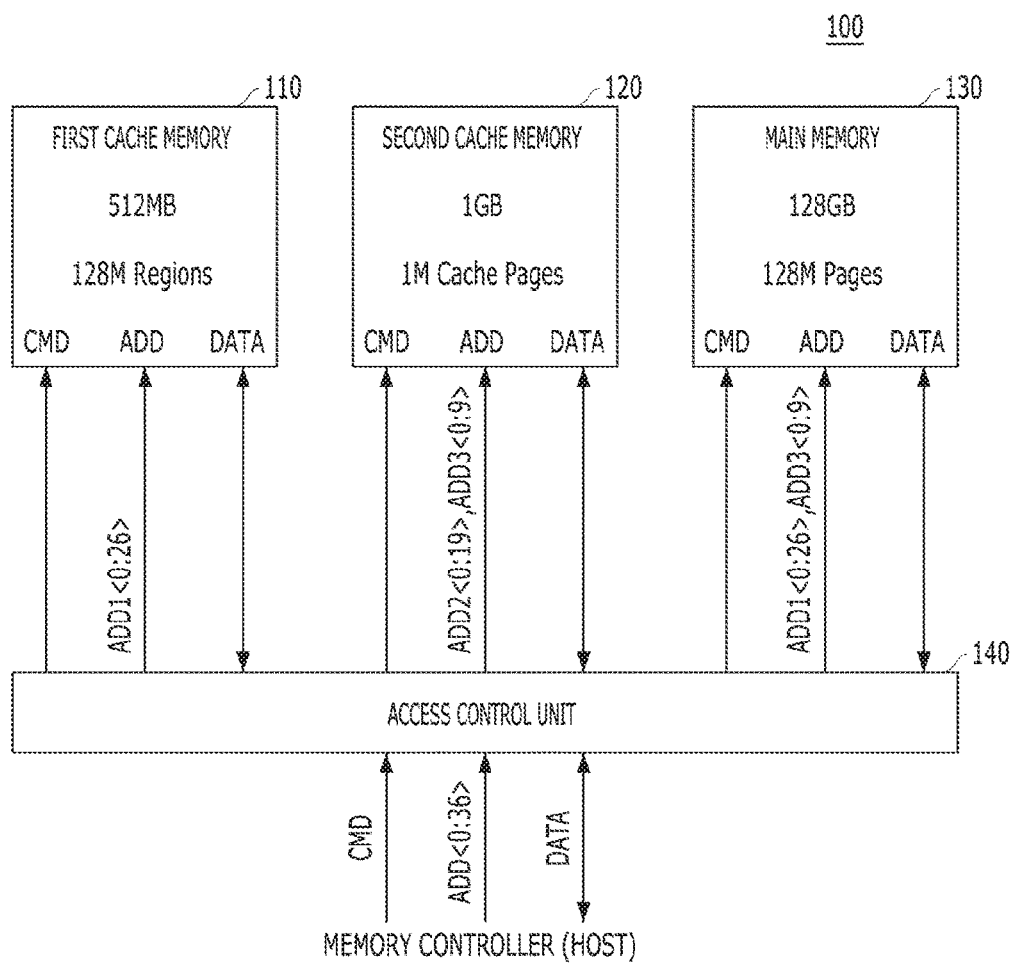

| | 4B (32bit) | |
|---|---|---|
| Faulty | ADD2 | Unused |
| 1bit | 20bit | 11bit |

| Cached | Faulty | Dirty/Clean | Counter | ADD2 |
|---|---|---|---|---|
| 1bit | 1bit | 1bit | 9bit | 20bit |

4B (32bit)

MEMORY SYSTEM

CROSS-REFERENCE TO RELATED APPLICATION

This application claims priority under 35 U.S.C. § 119 to Korean Patent Application No. 10-2015-0185001 filed on Dec. 23, 2015 in the Korean Intellectual Property Office, the disclosure of which is incorporated herein by reference in its entirety.

BACKGROUND OF THE INVENTION

1. Technical Field

Exemplary embodiments of the present disclosure relate to a memory system including a cache memory, a spare memory, a main memory and so forth.

2. Background Art

A general set-associative cache needs tag matching to determine cache hit/miss of data to be accessed. For tag matching, a cache needs a metadata storage and logic for tag matching. Such logic is very complex and causes an increase in memory system area, and a tag matching operation causes an increase in latency. This requires a cache structure minimizing an increase in the memory system area and an increase in latency.

Recently, research on next-generation memories such as a RRAM (Resistive Random Access Memory), a PCRAM (Phase-Change Random Access Memory), and an MRAM (Magnetic Random Access Memory), and FRAM (Ferro-electric Random Access Memory) has become more active. However, operating speeds of the next-generation memories have not reached a desired speed yet, and fault rates of the next-generation memories have not been reduced to a desired level. Furthermore, the next-generation memories have a problem of low endurance and thus are problematic in that many accesses, rapidly reduces the lifetime of the memory. Therefore, a cache structure which assists in increasing the operating speeds of the next-generation memories and a technology which solves the program of faults of the next-generation memories is required.

SUMMARY

Various embodiments are directed to a cache scheme capable of minimizing an increase in area of a memory system and an increase in latency. Also, various embodiments are directed to a cache scheme which not only enhances the performance of the memory system but also makes it possible to repair a fault in the memory system.

In an embodiment, a memory system may include: a first cache memory including a plurality of regions, which are accessed using a first address, and in each of which an indication of whether cached data is present and a second address are stored; a second cache memory configured to be accessed using the second address stored in an accessed region of the first cache memory when, as a result of an access of the first cache memory, cached data is present; and a main memory configured to be accessed using the first address when, as the result of the access of the first cache memory, cached data is not present.

In an embodiment, a memory system may include: a first cache memory including a plurality of regions, which are accessed using a first address, and in each of which whether a fault is present and a second address are stored; a spare memory configured to be accessed using the second address stored in an accessed region of the first cache memory in the case where, as a result of an access of the first cache memory, a fault is present; and a main memory configured to be accessed using the first address in the case where, as the result of the access of the first cache memory, a fault is not present.

In an embodiment, a memory system including: a first cache memory including a plurality of regions, which are accessed using a first address, and in each of which whether cached data is present, whether a fault is present, and a second address are stored; a second cache memory configured to be accessed using the second address stored in an accessed region of the first cache memory in the case where, as a result of an access of the first cache memory, cached data is present; a spare memory configured to be accessed using the second address stored in an accessed region of the first cache memory in the case where, as a result of the access of the first cache memory, cached data is not present and a fault is present; and a main memory configured to be accessed using the first address in the case where, as the result of the access of the first cache memory, neither cached data nor fault is present.

In an embodiment, an operating method of a memory system may include: accessing a first cache memory using a first address; accessing a second cache memory using a second address stored in the first cache memory in the case where, as a result of the access of the first cache memory, it is checked that cached data is present; and accessing a main memory using the first address in the case where, as the result of the access of the first cache memory, it is checked that cached data is not present.

BRIEF DESCRIPTION OF THE DRAWINGS

FIG. 1 is a diagram illustrating a configuration of a memory system in accordance with an embodiment.

FIG. 2 is a diagram illustrating information stored in each region of a first cache memory.

DETAILED DESCRIPTION

Figure 3:
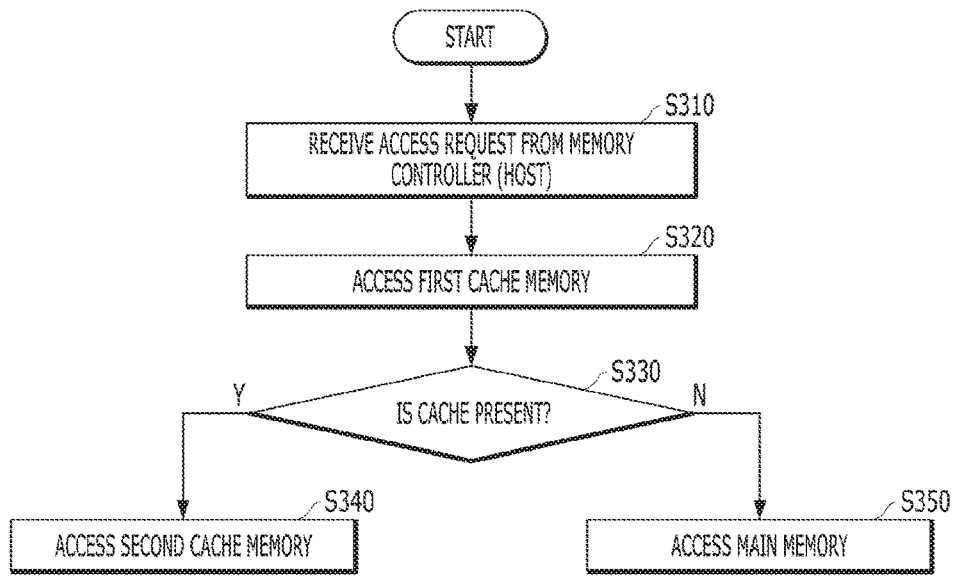
FIG. 3 is a flowchart showing operation of the memory system (100).

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey a scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

FIG. 1 is a diagram illustrating a configuration of a memory system 100 in accordance with an embodiment.

Referring to FIG. 1, the memory system 100 may include a first cache memory 110, a second cache memory 120, a main memory 130, and an access control unit 140.

The main memory 130 may have a large storage capacity and include a plurality of main pages. For example, the main memory may have an entire storage capacity of 128 GB (Giga Byte), and include 128M main pages. Each of the main pages may have a storage capacity of 1 KB (Kilo Byte). In each main page, data addressing on a byte basis may be possible, that is, each main page may be byte addressable. A first address ADD1<0:26> that is inputted to the main memory 130 may be used to select one main page among the 128M main pages in the main memory 130. Therefore, the first address ADD1<0:26> may be a 27-bit ($2^{27}=128M$) address. A third address ADD3<0:9> that is inputted to the main memory 130 may be used to select 1-byte of data in the main page (1 KB) selected by the first address ADD1<0:26>. Therefore, the third address ADD3<0:9> may be a 10-bit ($2^{10}=1K$) address. The main memory 130 may be a memory which has a storage capacity larger than that of the first cache memory 110 and the second cache memory 120, and the main memory 130 may have an operating speed lower than that of the first cache memory 110 or the second cache memory 120. For example, if each of the first cache memory 110 and the second cache memory 120 is a dynamic random access memory (DRAM), the main memory 130 may be any one of a flash memory, a phase-change random access memory (PCRAM), and a resistive random access memory (RRAM).

The first cache memory 110 may include the same number (128M) of regions as the main pages of the main memory 130. Because each of the regions stores metadata, each region may have a comparatively small storage capacity (e.g., 4B). During access of the first cache memory 110, one region among the regions may be selected by the first address ADD1<0:26> and accessed. Information such as that illustrated in FIG. 2 may be stored in each of the regions.

Referring to FIG. 2, cache information Cached may indicate whether cached data for a main page of the main memory 130 corresponding to an associated region of the first cache memory 110 is present in the second cache memory 120. The cache information Cached may be 1-bit information. Cache information Cached set to '1' may indicate that cached data is present. Cache information Cached set to '0' may indicate that cached data is not present. Dirty/clean information Dirty/Clean includes information about whether data cached in the second cache memory 120 and data stored in the main memory 130 are matched/not matched. The dirty/clean information Dirty/Clean may be 1-bit information. Dirty/clean information Dirty/Clean set to '1' may indicate a dirty state, in other words, that the data cached in the second cache memory 120 and the data stored in the main memory 130 are not matched. Dirty/clean information Dirty/Clean set to '0' may indicate a clean state, in other words, that the data cached in the second cache memory 120 and the data stored in the main memory 130 are matched. Access count information Counter may indicate the number of times an associated region is accessed. The case where the access count information Counter is 9-bit information is illustrated by way of example. A second address ADD2<0:19> may indicate an address of the second cache memory 120 in which cached data is stored. If cached data is present, the second cache memory 120 may be accessed using the second address ADD2<0:19>. The number of bits of the second address ADD2<0:19> may be based on the number of cache pages in the second cache memory 120. In this embodiment, because the second cache memory 120 has been described as including 1M cache pages, the case where the number of bits of the second address ADD2<0:19> is twenty is described by way of example. The remaining 1 bit in the region of the first cache memory 110 may be unused.

The second cache memory 120 may include a plurality of cache pages. Each of the cache pages may have the same storage capacity (e.g., 1 KB) as each of the main pages of the main memory 130. The number of cache pages may correspond to the number of bits in the second address. In this embodiment, because the second address ADD2<0:19> has been illustrated as being a 20-bit address, the number of cache pages may be 1M ($=2^{20}$). In the cache pages, cached data of corresponding main pages may be stored. The second address ADD2<0:19> may be used to select one page among the cache pages of the second cache memory 120. The third address ADD3<0:9> may be used to select 1-byte (1B) of data in the selected cache page (1 KB).

The access control unit 140 may access the first cache memory 110, the second cache memory 120, and the main memory 130 in response to a command CMD and an address ADD<0:36> transmitted from a memory controller (host) MEMORY CONTROLLER (HOST), and the access control unit 140 may exchange data DATA of the first cache memory 110, the second cache memory 120, and the main memory 130 with the memory controller (host) MEMORY CONTROLLER (HOST).

FIG. 3 is a flowchart showing operation of the memory system 100. The operation of the memory system 100 will be described with reference to FIG. 3.

First, a command CMD (for example, a read command or write command) and an address ADD<0:36> for accessing the memory system 100 may be applied from the memory controller (host), at step S310. If the command CMD is a write command, data DATA to be written to the memory system 100 may also be applied to the memory system 100.

The access control unit 140 may first access the first cache memory 110, at step S320. The access control unit 140 may use 27 bits among the address ADD<0:36> transmitted from the memory controller (host) as the first address ADD1<0:26> for accessing the first cache memory 110. The dirty/clean information Dirty/Clean and the access count information Counter may be stored in each of the plurality of regions of the first cache memory 110. During access of the first cache memory 110, dirty/clean information Dirty/Clean and access count information Counter of a selected region of the first cache memory 110 accessed using the first address ADD1<0:26> may be updated.

When information that cached data is present in the selected region of the first cache memory 110 accessed using the first address ADD1<0:26> is stored (Y at step S330), the cache information Cached may be set to '1'. When the cache information Cached='1', the access control unit 140 may access the second cache memory 120 using the second address ADD2<0:19> stored in the selected region of the first cache memory 110, at step S340. During access of the second cache memory 120, the second address ADD2<0:19> may be used to select a cache page from the second cache memory 120, and the third address ADD3<0:9> may be used to select data from the selected cache page. The third address ADD3<0:9> may be a remaining address other than the first address ADD1<0:26> among the address ADD<0:36> received by the access control unit 140 from the memory controller (host) at step S310. If, at step S310, the command CMD received by the access control unit 140 from the memory controller (host) is a read command, the data read from the second cache memory 120 at step S340 may be transmitted to the memory controller (host) through the access control unit 140. If, at step S310, the command CMD received by the access control unit 140 from the memory controller (host) is a write command, the data DATA received by the accessed control unit 140 from the memory controller (host) at step S310 may be written to the second cache memory 120, at step S340.

If information that cached data is not present in the selected region of the first cache memory 110 accessed using the first address ADD1<0:26> is stored (N at step S330), the cache information Cached may be set equal to '0'. When the cache information Cached='0', the access control unit 140 may access the main memory 130 using the first address ADD1<0:26> and the third address ADD3<0:9>, at step S350. The third address ADD3<0:9> may be a remaining address other than the first address ADD1<0:26> among the address ADD<0:36> received by the access control unit 140 from the memory controller (host). If, at step S310, the command CMD received by the access control unit 140 from the memory controller (host) is a read command, the data read from the main memory 130 at step S350 may be transmitted to the memory controller (host) through the access control unit 140. If, at step S310, the command CMD received by the access control unit 140 from the memory controller (host) is a write command, the data DATA received by the accessed control unit 140 from the memory controller (host) at step S310 may be written to the main memory 130, at step S350.

In the memory system 100, the first cache memory 110 is first accessed to check whether cached data is present. If cached data is present, the second cache memory 120 may be accessed using the second address ADD2<0:19> stored in the first cache memory 110 so that data is read or written. If cached data is not present, the main memory 130 may be accessed so that data is read or written. Such a cache scheme makes it possible to increase the access speed of the memory system 100 despite minimizing an increase in area of the memory system 100 for caching.

In the memory system 100, operations such as addition of data to be cached to the second cache memory 120 and eviction of data already cached in the second cache memory 120 may be performed according to cache management rules of the memory system 100. The operations may be performed with reference to the dirty/clean information Dirty/Clean, the counter information Counter, and the like that are stored in each of plurality of regions of the first cache memory 110. Furthermore, a cache management logic (not shown) for performing addition of data to be cached and the eviction of previously cached data may be added to the memory system 100 or provided outside the memory system 100.

The parts 110, 120, 130 and 140 of the memory system 100 shown in FIG. 1 are parts that are divided based on functional aspects rather than being physically divided. For example, two or more of the parts 110, 120, 130 and 140 of FIG. 1 may be formed on a single physical semiconductor chip or included in a single semiconductor package. Furthermore, for the first cache memory 110, the second cache memory 120, and the main memory 130 that are illustrated in FIG. 1, the entire capacity, the number of pages, and the capacity of each page are only for illustrative purposes, and these may be modified in various ways.

Figure 4:
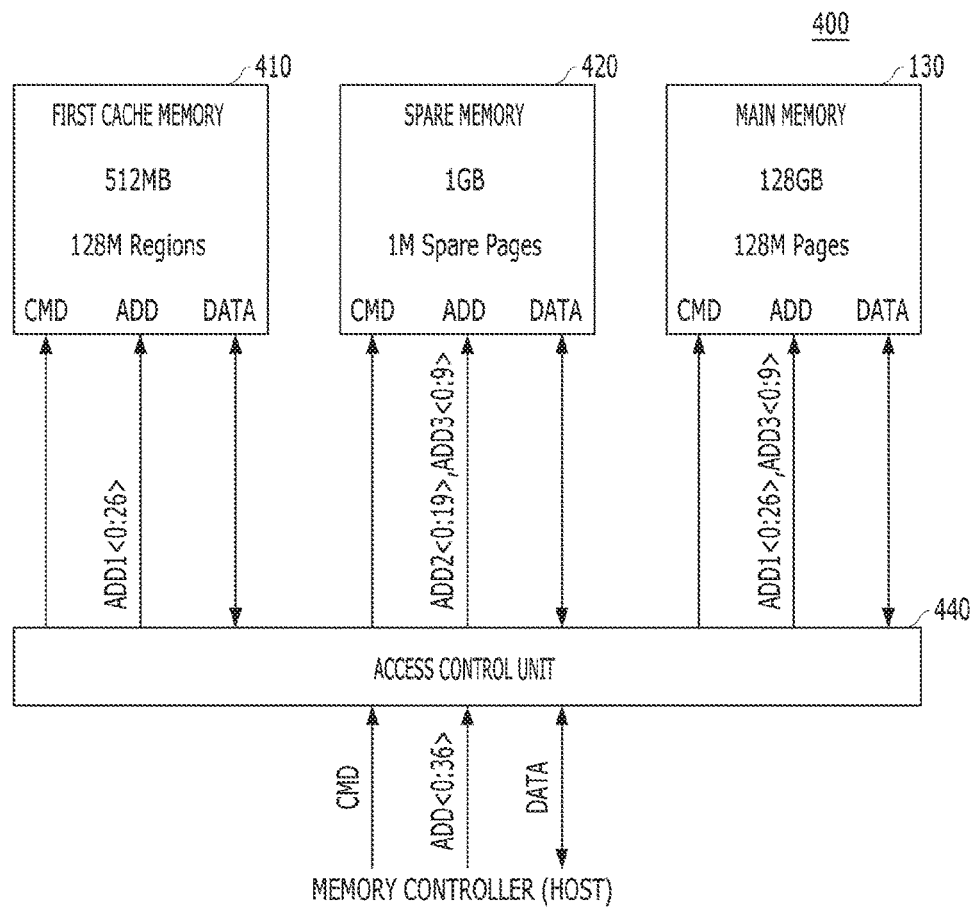
FIG. 4 is a diagram illustrating a configuration of a memory device in accordance with another embodiment.

FIG. 4 is a diagram illustrating a configuration of a memory system in accordance with another embodiment.

Referring to FIG. 4, the memory system 400 may include a first cache memory 410, a spare memory 420, a main memory 130, and an access control unit 440.

The main memory 130 may have a large storage capacity and include a plurality of main pages. For example, the main memory may have an entire storage capacity of 128 GB (Giga Byte), and include 128M main pages. Each of the main pages may have a storage capacity of 1 KB (Kilo Byte). In each main page, data addressing on a byte basis may be possible, that is, each main page may be byte addressable. A first address ADD1<0:26> that is inputted to the main memory 130 may be used to select one main page among the 128M main pages in the main memory 130. Therefore, the first address ADD1<0:26> may be a 27-bit ($2^{27}$=128M) address. A third address ADD3<0:9> that is inputted to the main memory 130 may be used to select 1-byte of data in the main page (1 KB) selected by the first address ADD1<0:26>. Therefore, the third address ADD3<0:9> may be a 10-bit ($2^{10}$=1K) address. The main memory 130 may be a memory which has a storage capacity larger than that of the first cache memory 110 and the spare memory 420, and the main memory 130 may have an operating speed lower than that of the first cache memory 110. For example, if the first cache memory 410 is a DRAM, the main memory 130 may be any one of a flash memory, a PCRAM and an RRAM.

The first cache memory 410 may include the same number (128M) of regions as that of main pages of the main memory 130. Because each of the regions stores metadata therein, the first cache memory 410 may have a comparatively small storage capacity (e.g., 4B). During access of the first cache memory 410, one region among the regions may be selected by the first address ADD1<0:26> and accessed. Information such as that of FIG. 5 may be stored in each of the regions.

Figures 5, 6:
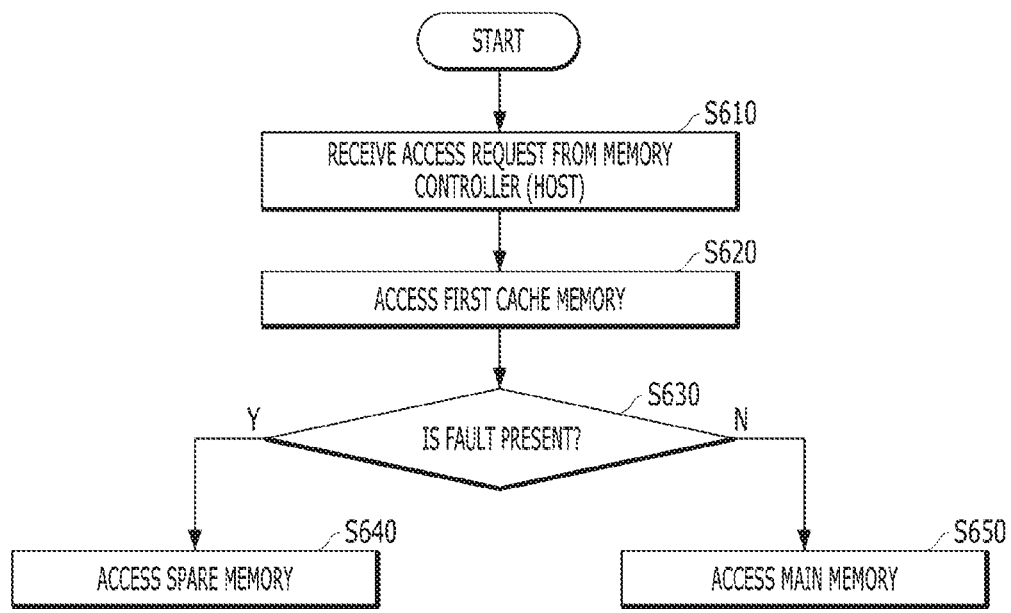
FIG. 5 is a diagram illustrating information stored in each region of a first cache memory.
FIG. 6 is a flowchart showing operation of a memory system (400).

Referring to FIG. 5, fault information Faulty may indicate whether a fault is present in a main page of the main memory 130 corresponding to an associated region of the first cache memory 410. The fault information Faulty may be 1-bit information. If the fault information Faulty is '1', the fault information Faulty may indicate that a fault is present. If the fault information Faulty is '0', fault information Faulty may indicate that a fault is not present. The second address ADD2<0:19> may refer to, when a fault is present in a main page, an address of a spare page in the spare memory 420 that substitutes for the corresponding main page. When a fault is present in the main page, the spare memory 420 may be accessed using the second address ADD2<0:19>. The number of bits of the second address ADD2<0:19> may be determined depending on the number of spare pages in the spare memory 420. In this embodiment, because the spare memory 420 is described as including 1M spare pages, the case where the number of bits of the second address ADD2<0:19> is twenty is described by way of example. The remaining 11 bits in the region of the first cache memory 410 may be unused.

The spare memory 420 may include a plurality of spare pages. Each of the spare pages may have the same storage capacity (e.g., 1 KB) as that of each of the main pages of the main memory 130. The number of spare pages may correspond to the number of bits in the second address. In this embodiment, because the second address ADD2<0:19> has been illustrated as being a 20-bit address, the number of cache pages may be 1M (=2^20). Data that should be stored in the corresponding main pages, that is, in the faulty main pages, may be stored in the spare pages. In other words, the spare pages may substitute for (repair) of the faulty main pages. The second address ADD2<0:19> may be used to select one spare page among the spare pages in the spare memory 420. The third address ADD3<0:9> may be used to select 1-byte (1B) of data in the selected spare page (1 KB). The spare memory 420 may be the same kind of memory as that of the main memory 130.

The access control unit 440 may access the first cache memory 410, the spare memory 420, and the main memory 130 in response to a command CMD and an address ADD<0:36> transmitted from a memory controller (host) MEMORY CONTROLLER (HOST), and the access control unit 440 may exchange data DATA of the first cache memory 410, the spare memory 420, and the main memory 130 with the memory controller (host) MEMORY CONTROLLER (HOST).

FIG. 6 is a flowchart showing operation of the memory system 400. The operation of the memory system 400 will be described with reference to FIG. 6.

First, a command CMD (for example, a read command or write command) and an address ADD<0:36> for accessing the memory system 400 may be applied from the memory controller (host), at step S610. If the command CMD is a write command, data DATA to be written to the memory system 400 may also be applied to the memory system 400.

The access control unit 440 may first access the first cache memory 410, at step S620. The access control unit 440 may use 27 bits among the address ADD<0:36> transmitted from the memory controller (host) as the first address ADD1<0:26> for accessing the first cache memory 410.

When information that a fault is present in the selected region of the first cache memory 410 accessed using the first address ADD1<0:26> is stored (Y at step S630), the fault information Faulty may be set to '1'. When the fault information Faulty='1', the access control unit 440 may access the spare memory 420 using the second address ADD2<0:19> stored in the selected region of the first cache memory 410, at step S640. During access of the spare memory 420, the second address ADD2<0:19> may be used to select a spare page from the spare memory 420, and the third address ADD3<0:9> may be used to select data from the selected spare page. The third address ADD3<0:9> may be a remaining address other than the first address ADD1<0:26> among the address ADD<0:36> received by the access control unit 440 from the memory controller (host) at step S610. When, at step S610, the command CMD received by the access control unit 440 from the memory controller (host) is a read command, the data read from the spare memory 420 at step S640 may be transmitted to the memory controller (host) through the access control unit 440. If, at step S610, the command CMD received by the access control unit 440 from the memory controller (host) is a write command, the data DATA received by the accessed control unit 440 from the memory controller (host) at step S610 may be written to the spare memory 420, at step S640.

When information that a fault is not present in the selected region of the first cache memory 410 accessed using the first address ADD1<0:26> is stored (N at step S630), the fault information may be set equal to '0'. When the fault information Faulty='0', the access control unit 440 may access the main memory 130 using the first address ADD1<0:26> and the third address ADD3<0:9>, at step S650. The third address ADD3<0:9> may be a remaining address other than the first address ADD1<0:26> among the address ADD<0:36> received by the access control unit 440 from the memory controller (host) at step S610. If, at step S610, the command CMD received by the access control unit 440 from the memory controller (host) is a read command, the data read from the main memory 130 at step S650 may be transmitted to the memory controller (host) through the access control unit 440. If, at step S610, the command CMD received by the access control unit 440 from the memory controller (host) is a write command, the data DATA received by the access control unit 440 from the memory controller (host) at step S610 may be written to the spare memory 420, at step S650.

In the memory system 400, the first cache memory 410 is first accessed to check whether a fault is present. If a fault is present, the spare memory 420 may be accessed using the second address ADD2<0:19> stored in the first cache memory 410, whereby data can be read or written without a fault. If a fault is not present, the main memory 130 may be accessed so that data is read or written. Such a repair scheme makes it possible to repair the memory system 130 despite minimizing an increase in area of the memory system 130 for the repair.

The parts 410, 420, 130 and 440 of the memory system 400 shown in FIG. 4 mean parts that are divided based on functional aspects rather than being physically divided. For example, two or more of the parts 410, 420, 130 and 440 of FIG. 4 may be formed on a single physical semiconductor chip or included in a single semiconductor package. Furthermore, for the first cache memory 410, the spare memory 420, and the main memory 130 that are illustrated in FIG. 4, the entire capacity, the number of pages, and the capacity of each page are only for illustrative purposes, and these may be modified in various ways.

Figures 7, 8:
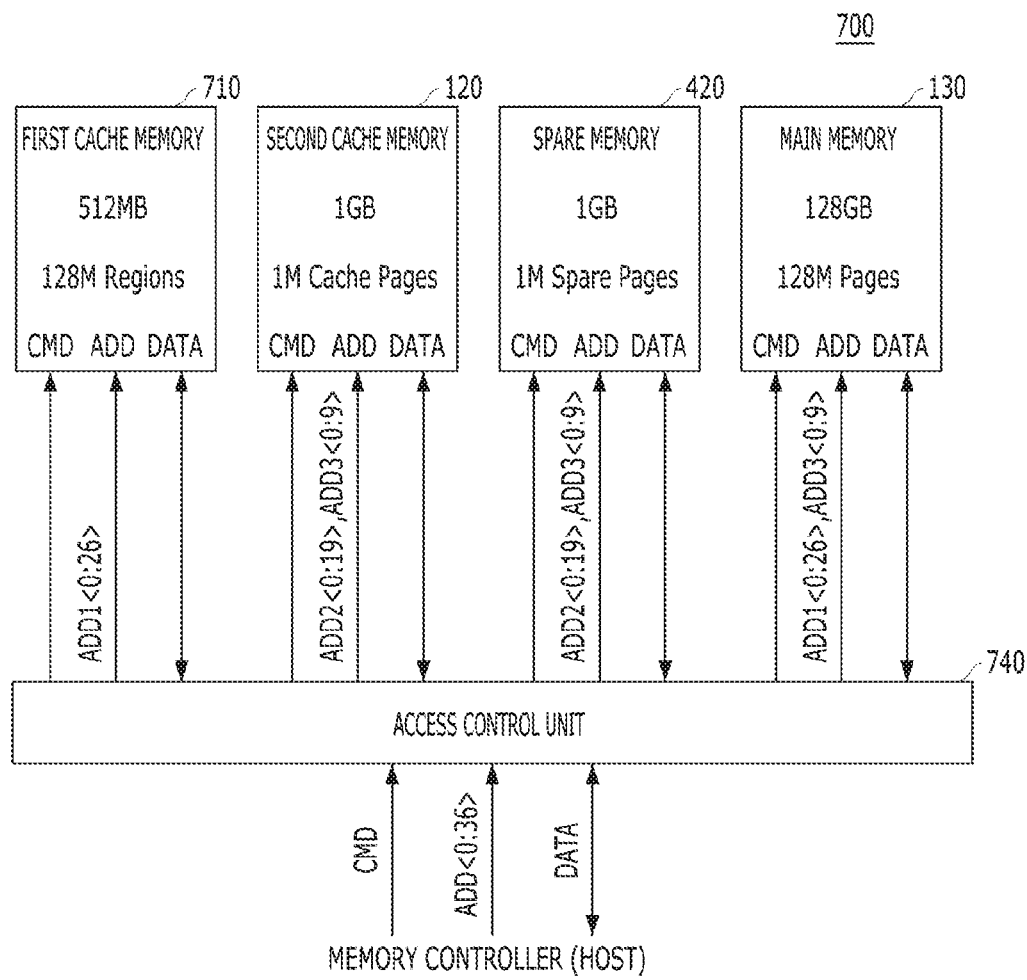
FIG. 7 is a diagram illustrating a configuration of a memory device in accordance with another embodiment.
FIG. 8 is a diagram illustrating information stored in each region of a first cache memory.

FIG. 7 is a diagram illustrating a configuration a memory device in accordance with another embodiment.

Referring to FIG. 7, the memory system 700 may include a first cache memory 710, a second cache memory 120, a spare memory 420, a main memory 130, and an access control unit 740.

The main memory 130 may have a large storage capacity and may include a plurality of main pages. For example, the main memory may have an entire storage capacity of 128 GB (Giga Byte), and include 128M main pages. Each of the main pages may have a storage capacity of 1 KB (Kilo Byte). In each main page, data addressing on a byte basis may be possible, that is, each main page may be byte addressable. A first address ADD1<0:26> that is inputted to the main memory 130 may be used to select one main page among the 128M main pages in the main memory 130.

Therefore, the first address ADD1<0:26> may be a 27-bit (2^27=128M) address. A third address ADD3<0:9> that is inputted to the main memory 130 may be used to select 1-byte of data in the main page (1 KB) selected by the first address ADD1<0:26>. Therefore, the third address ADD3<0:9> may be a 10-bit (2^10=1K) address. Each of the main memory 130 and the spare memory 420 may be a memory which has an operating speed lower than that of the first cache memory 710 and the second cache memory 120. For example, if each of the first cache memory 710 and the second cache memory 120 is a DRAM, each of the main memory 130 and the spare memory 420 may be any one of a flash memory, a PCRAM and an RRAM.

The first cache memory 710 may include the same number (128M) of regions as that of main pages of the main memory 130. Because each of the regions stores metadata therein, the first cache memory 710 may have a storage capacity (e.g., 4B) that is less than the main memory 130. During access of the first cache memory 710, one region among the regions may be selected by the first address ADD1<0:26> and accessed. Information such as that of FIG. 8 may be stored in each of the regions.

Referring to FIG. 8, cache information Cached may indicate whether cached data for a main page of the main memory 130 corresponding to an associated region of the first cache memory 710 is present in the second cache memory 120. The cache information Cached may be 1-bit information. If the cache information Cached is '1', the cache information Cached may indicate that cached data is present. If the cache information Cached is '0', the cache information Cached may indicate that cached data is not present. Furthermore, fault information Faulty may indicate whether a fault is present in a main page of the main memory 130 corresponding to an associated region of the first cache memory 710. The fault information Faulty may be 1-bit information. If the fault information Faulty is '1', the fault information Faulty may indicate that a fault is present. If the fault information Faulty is '0', the fault information Faulty may indicate that a fault is not present. Dirty/clean information Dirty/Clean and access count information Counter may be stored in each of the plurality of regions of the first cache memory 710. The dirty/clean information Dirty/Clean includes information about whether data cached in the second cache memory 120 and data stored in the main memory 130 are matched/not matched. The dirty/clean information Dirty/Clean may be 1-bit information. If the dirty/clean information Dirty/Clean is '1', the dirty/clean information Dirty/Clean may indicate a dirty state, in other words, that data cached in the second cache memory 120 and data stored in the main memory 130 are not matched. If the dirty/clean information Dirty/Clean is '0', the dirty/clean information Dirty/Clean may indicate a clean state, in other words, that the data cached in the second cache memory 120 and the data stored in the main memory 130 are matched. Access count information Counter may indicate the number of times an associated region has been accessed. The case where the access count information Counter is 9-bit information is illustrated by way of example. The second address ADD2<0:19> may refer to an address of the second cache memory 120 in which cached data is stored, or a spare page in the spare memory 420 that substitutes for the corresponding main page. If cached data is present, the second cache memory 120 may be accessed using the second address ADD2<0:19>. If a fault is present, the spare memory 420 may be accessed using the second address ADD2<0:19>. The number of bits of the second address ADD2<0:19> may be determined depending on the number of cache pages in the second cache memory 120 and the number of spare pages in the spare memory 420. In this embodiment, because the second cache memory 120 has been described as including 1M cache pages and the spare memory 420 has been described as including 1M spare pages, the case where the number of bits of the second address ADD2<0:19> is twenty is described by way of example.

The second cache memory 120 may include a plurality of cache pages. Each of the cache pages may have the same or smaller storage capacity (e.g., 1 KB) as each of the main pages of the main memory 130. The number of cache pages may correspond to the number of bits in the second address. In this embodiment, because the second address ADD2<0: 19> has been illustrated as being a 20-bit address, the number of cache pages may be 1M (=2^20). In the cache pages, cached data of corresponding main pages may be stored. The second address ADD2<0:19> may be used to select one cache page among the cache pages of the second cache memory 120. The third address ADD3<0:9> may be used to select 1-byte (1B) of data in the selected cache page (1 KB).

The spare memory 420 may include a plurality of spare pages. Each of the spare pages may have the same or smaller storage capacity (e.g., 1 KB) as each of the main pages of the main memory 130. The number of spare pages may correspond to the number of bits in the second address. In this embodiment, because the second address ADD2<0:19> has been illustrated as being a 20-bit address, the number of cache pages may be 1M (=2^20). Data that should be stored in the corresponding main pages, that is, in the faulty main pages, may be stored in the spare pages. In other words, the spare pages may substitute for (repair) the faulty main pages. The second address ADD2<0:19> may be used to select one spare page among the spare pages in the spare memory 420. The third address ADD3<0:9> may be used to select 1-byte (1B) of data in the selected spare page (1 KB). The spare memory 420 may be the same kind of memory as that of the main memory 130.

The access control unit 740 may access the first cache memory 710, the second cache memory 120, the spare memory 420, and the main memory 130 in response to a command CMD and an address ADD<0:36> transmitted from a memory controller (host) MEMORY CONTROLLER (HOST), and the access control unit 740 may exchange data DATA of the first cache memory 710, the second cache memory 120, the spare memory 420, and the main memory 130 with the memory controller (host) MEMORY CONTROLLER (HOST).

Figure 9:
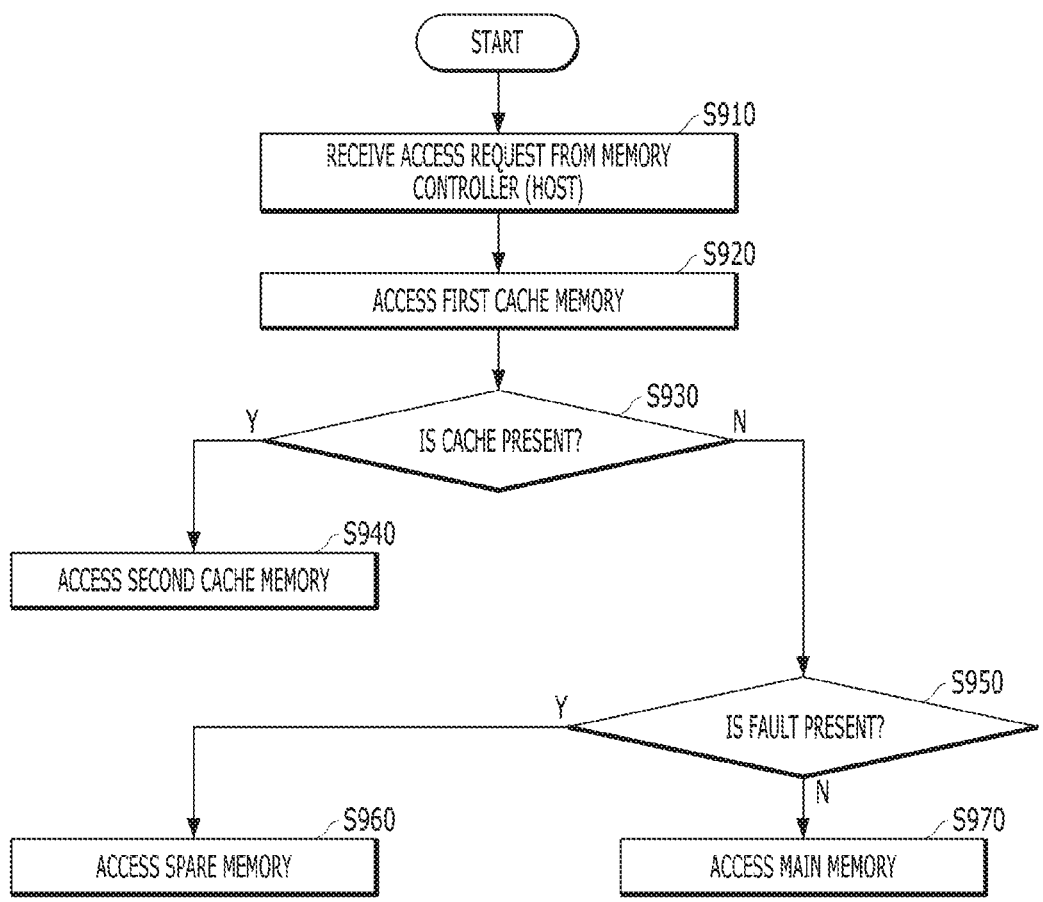
FIG. 9 is a flowchart showing operation of a memory system (700).

FIG. 9 is a flowchart showing operation of the memory system 700. The operation of the memory system 700 will be described with reference to FIG. 9.

First, a command CMD (for example, a read command or write command) and an address ADD<0:36> for accessing the memory system 700 may be applied from the memory controller (host), at step S910. If the command CMD is a write command, data DATA to be written to the memory system 700 may also be applied to the memory system 700.

The access control unit 740 may first access the first cache memory 710, at step S920. The access control unit 740 may use 27 bits among the address ADD<0:36> transmitted from the memory controller (host) as the first address ADD1<0: 26> for accessing the first cache memory 710. During the access of the first cache memory 710, dirty/clean information Dirty/Clean, and access count information Counter of a selected region of the first cache memory 710 accessed using the first address ADD1<0:26> may be updated.

When information that cached data is present in the selected region of the first cache memory 710 accessed using the first address ADD1<0:26> is stored (Y at step S930), the cache information Cached may be set to '1'. When the cache information Cached='1', the access control unit 740 may access the second cache memory 120 using the second address ADD2<0:19> stored in the selected region of the first cache memory 710, at step S940. During access of the second cache memory 120, the second address ADD2<0: 19> may be used to select a cache page from the second cache memory 120, and the third address ADD3<0:9> may be used to select data from the selected cache page. The third address ADD3<0:9> may be a remaining address other than the first address ADD1<0:26> among the address ADD<0:

36> received by the access control unit 740 from the memory controller (host) at step S910. When, at step S910, the command CMD received by the access control unit 740 from the memory controller (host) is a read command, the data read from the second cache memory 120 at step S940 may be transmitted to the memory controller (host) through the access control unit 740. If, at step S910, the command CMD received by the access control unit 740 from the memory controller (host) is a write command, the data DATA received by the accessed control unit 740 from the memory controller (host) at step S910 may be written to the second cache memory 120, at step S940.

When information that cached data is not present in the selected region of the first cache memory 710 accessed using the first address ADD1<0:26> is stored (N at step S930), the cache information Cached may be set equal to '0'. When the cache information Cached='0', fault information Faulty stored in the selected region of the first cached memory 710 accessed using the first address ADD1<0:26> may be checked, at step S950.

When information that a fault is present in the selected region of the first cache memory 710 accessed using the first address ADD1<0:26> is stored (Y at step S950), the fault information Faulty may be set to '1'. When the fault information Faulty='1', the access control unit 740 may access the spare memory 420 using the second address ADD2<0:19> stored in the selected region of the first cache memory 710 instead of accessing the main memory 130, at step S960. During access of the spare memory 420, the second address ADD2<0:19> may be used to select a spare page from the spare memory 420, and the third address ADD3<0:9> may be used to select data in the selected spare page. When, at step S910, the command CMD received by the access control unit 740 from the memory controller (host) is a read command, the data read from the spare memory 420 at step S960 may be transmitted to the memory controller (host) through the access control unit 740. If, at step S910, the command CMD received by the access control unit 740 from the memory controller (host) is a write command, the data DATA received by the accessed control unit 740 from the memory controller (host) at step S910 may be written to the spare memory 420, at step S960.

When information that a fault is not present in the selected region of the first cache memory 710 accessed using the first address ADD1<0:26> (N at step S950), the fault information may be set equal to '0'. When the fault information Faulty='0', the access control unit 740 may access the main memory 130 using the first address ADD1<0:26> and the third address ADD3<0:9>, at step S970. If, at step S910, the command CMD received by the access control unit 740 from the memory controller (host) is a read command, the data read from the spare memory 130 at step S970 may be transmitted to the memory controller (host) through the access control unit 740. If, at step S910, the command CMD received by the access control unit 740 from the memory controller (host) is a write command, the data DATA received by the accessed control unit 740 from the memory controller (host) at step S910 may be written to the main memory 130, at step S970.

In the memory system 700, the first cache memory 710 is first accessed to check whether cached data is present. If cached data is present, the second cache memory 120 may be accessed using the second address ADD2<0:19> stored in the first cache memory 710 so that data is read or written. If the cached data is not present, it is determined whether a fault is present. If a fault is present and the cached data is not present, the spare memory 420 is accessed using the second address ADD2<0:19> stored in the first cache memory 710 so that data can be read or written without a fault. If a fault is not present, because of an access of the first cache memory 110 the main memory 130 is accessed using the first address ADD1<0:26> so that data is read or written. Such a cache scheme makes it possible to increase the access speed of the memory system 700 despite minimizing an increase in the area of the memory system 700 for caching and repairing.

In the memory system 700, operations such as addition of data to be cached to the second cache memory 120 and eviction of data already cached in the second cache memory 120 may be performed according to cache management rules of the memory system 700 with reference to the dirty/clean information Dirty/Clean, the counter information Counter, and the like that are stored in the first cache memory 710. Furthermore, a cache management logic (not shown) for performing the addition of data to be cached and the eviction of already cached data may be added to the memory system 700 or provided from outside the memory system 700.

The parts 710, 120, 420, 130 and 740 of the memory system 700 shown in FIG. 7 indicate parts that are divided based on functional aspects rather than being physically divided. For example, two or more of the parts 710, 120, 420, 130 and 740 of FIG. 7 may be formed on a single physical semiconductor chip or included in a single semiconductor package. Furthermore, for the first cache memory 710, the second cache memory 120, the spare memory 420, and the main memory 130 that are illustrated in FIG. 7, the entire capacity, the number of pages, and the capacity of each page are only for illustrative purposes, and these may be modified in various ways.

According to various embodiments, an increase in area of a memory system and an increase in latency may be minimized, and repair of a fault in the memory system may be possible.

Although various embodiments have been described for illustrative purposes, it will be apparent to those skilled in the art that various changes and modifications may be made without departing from the spirit and scope of the invention as defined in the following claims.

Figure 10:
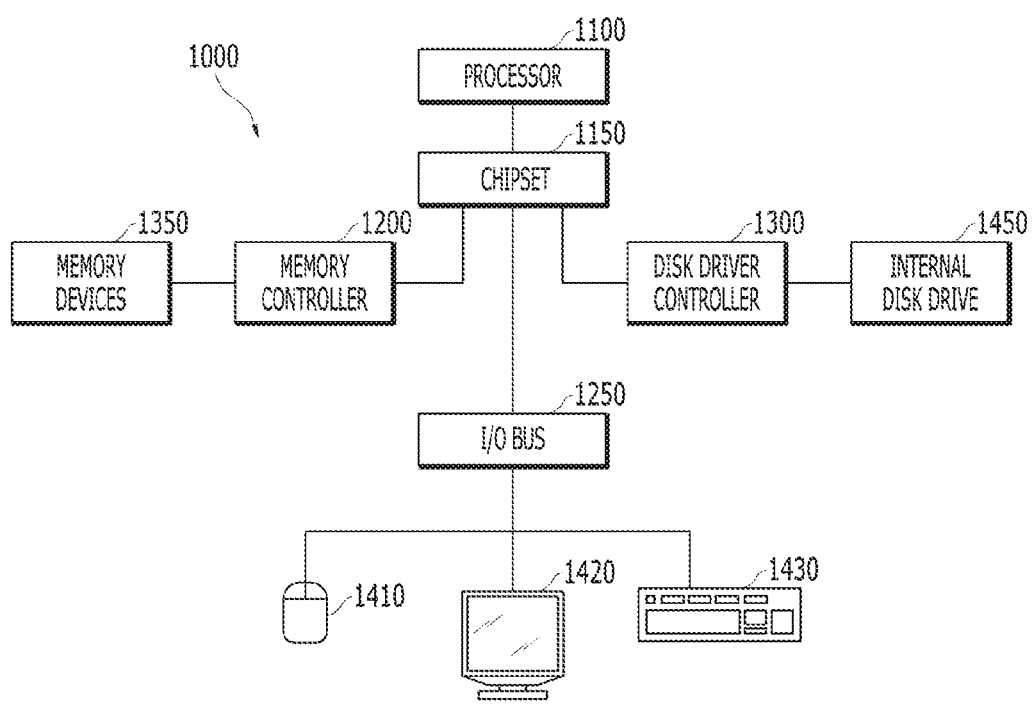
FIG. 10 illustrates a block diagram of an example representation of a system employing a semiconductor device in accordance with the various embodiments discussed above with relation to FIGS. 1-9.

The semiconductor devices and/or a memory system discussed above (see FIGS. 1-9) are particularly useful in the design of memory devices, processors, and computer systems. For example, referring to FIG. 10, a block diagram of a system employing a semiconductor device and/or a memory in accordance with the various embodiments are illustrated and generally designated by a reference numeral 1000. The system 1000 may include one or more processors (i.e., Processor) or, for example but not limited to, central processing units ("CPUs") 1100. The processor (i.e., CPU) 1100 may be used individually or in combination with other processors (i.e., CPUs). While the processor (i.e., CPU) 1100 will be referred to primarily in the singular, it will be understood by those skilled in the art that a system 1000 with any number of physical or logical processors (i.e., CPUs) may be implemented.

A chipset 1150 may be operably coupled to the processor (i.e., CPU) 1100. The chipset 1150 is a communication pathway for signals between the processor (i.e., CPU) 1100 and other components of the system 1000. Other components of the system 1000 may include a memory controller 1200, an input/output ("I/O") bus 1250, and a disk driver controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system 1000.

As stated above, the memory controller 1200 may be operably coupled to the chipset 1150. The memory controller 1200 may include at least one semiconductor device and/or a memory system as discussed above with reference to FIGS. 1-9. Thus, the memory controller 1200 can receive a request provided from the processor (i.e., CPU) 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one semiconductor device and/or a memory system as discussed above with relation to FIGS. 1-9, the memory devices 1350 may include a plurality of word lines and a plurality of bit lines for defining a plurality of memory cells. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420, and 1430. The I/O devices 1410, 1420, and 1430 may include, for example but are not limited to, a mouse 1410, a video display 1420, or a keyboard 1430. The I/O bus 1250 may employ any one of a number of communications protocols to communicate with the I/O devices 1410, 1420, and 1430. In an embodiment, the I/O bus 1250 may be integrated into the chipset 1150.

The disk driver controller 1300 may be operably coupled to the chipset 1150. The disk driver controller 1300 may serve as the communication pathway between the chipset 1150 and one internal disk driver 1450 or more than one internal disk driver 1450. The internal disk driver 1450 may facilitate disconnection of the external data storage devices by storing both instructions and data. The disk driver controller 1300 and the internal disk driver 1450 may communicate with each other or with the chipset 1150 using virtually any type of communication protocol, including, for example but not limited to, all of those mentioned above with regard to the I/O bus 1250.

It is important to note that the system 1000 described above in relation to FIG. 10 is merely one example of a system 1000 employing a semiconductor device and/or a memory system as discussed above with relation to FIGS. 1-9. In alternate embodiments, such as, for example but not limited to, cellular phones or digital cameras, the components may differ from the embodiments illustrated in FIG. 10.

What is claimed is:

1. A memory system comprising:
a first cache memory including a plurality of regions, which are accessed using a portion of a host address, and in each of which an indication of whether cached data is present and a second address are stored;
a second cache memory configured to be accessed using the rest of the host address and the second address stored in an accessed region of the first cache memory when, as a result of an access of the first cache memory, cached data is present; and
a main memory configured to be accessed using the entirety of the host address when, as the result of the access of the first cache memory, cached data is not present.

2. The memory system of claim 1,
wherein the main memory includes a plurality of main pages, and
wherein the portion of the host address is used to select one main page among the plurality of main pages, and the rest of the host address is used to select data in the selected main page.

3. The memory system of claim 1,
wherein the second cache memory includes a plurality of cache pages, and
wherein the second address is used to select one cache page among the plurality of cache pages, and the rest of the host address is used to select data in the selected cache page.

4. The memory system of claim 1, wherein dirty/clean information and access count information are stored in each of the plurality of regions of the first cache memory.

5. The memory system of claim 1,
wherein an operating speed of the main memory is lower than an operating speed of each of the first cache memory and the second cache memory, and
wherein a storage capacity of the main memory is larger than a storage capacity of each of the first cache memory and the second cache memory.

6. A memory system comprising:
a first cache memory including a plurality of regions, which are accessed using a portion of a host address, and in each of which an indication of whether a fault is present and a second address are stored;
a spare memory configured to be accessed using the rest of the host address and the second address stored in an accessed region of the first cache memory when, as a result of an access of the first cache memory, a fault is present; and
a main memory configured to be accessed using the entirety of the host address when, as the result of the access of the first cache memory, a fault is not present.

7. The memory system of claim 6,
wherein the main memory includes a plurality of main pages, and
wherein the portion of the host address is used to select one main page among the plurality of main pages, and the rest of the host address is used to select data in the selected main page.

8. The memory system of claim 6,
wherein the spare memory includes a plurality of spare pages, and
wherein the second address is used to select one spare page among the plurality of spare pages, and the rest of the host address is used to select data in the selected spare page.

9. The memory system of claim 6,
wherein an operating speed of each of the main memory and the spare memory is lower than an operating speed of the first cache memory, and
wherein a storage capacity of the main memory is larger than a storage capacity of each of the first cache memory and the spare memory.

10. A memory system comprising:
a first cache memory including a plurality of regions, which are accessed using a portion of a host address, and in each of which an indication of whether cached data is present, an indication of whether a fault is present, and a second address are stored;

a second cache memory configured to be accessed using the rest of the host address and the second address stored in an accessed region of the first cache memory when, as a result of an access of the first cache memory, cached data is present;

a spare memory configured to be accessed using the rest of the host address and the second address stored in an accessed region of the first cache memory when, as a result of the access of the first cache memory, cached data is not present and a fault is present; and a main memory configured to be accessed using the entirety of the host address when, as the result of the access of the first cache memory, neither cached data nor fault is present.

11. The memory system of claim 10, wherein the main memory includes a plurality of main pages, and wherein the portion of the host address is used to select one main page among the plurality of main pages, and the rest of the host address is used to select data in the selected main page.

12. The memory system of claim 10, wherein the second cache memory includes a plurality of cache pages, and wherein the second address is used to select one cache page among the plurality of cache pages, and the rest of the host address is used to select data in the selected cache page.

13. The memory system of claim 10, wherein the spare memory includes a plurality of spare pages, and wherein the second address is used to select one spare page among the plurality of spare pages, and the rest of the host address is used to select data in the selected spare page.

14. The memory system of claim 10, wherein dirty/clean information and access count information are stored in each of the plurality of regions of the first cache memory.

15. The memory system of claim 10, wherein an operating speed of each of the main memory and the spare memory is lower than an operating speed of each of the first cache memory and the second cache memory, and wherein a storage capacity of the main memory is larger than a storage capacity of each of the spare memory, the first cache memory and the second cache memory.

16. An operating method of a memory system comprising:

accessing a first cache memory using a portion of a host address;

accessing a second cache memory using the rest of the host address and a second address stored in the first cache memory when, as a result of the access of the first cache memory, it is determined whether cached data is present; and accessing a main memory using the entire of the host address when, as the result of the access of the first cache memory, it is determined whether cached data is not present.

17. The operating method of claim 16, further comprising:

accessing a spare memory using the rest of the host address and the second address stored in the first cache memory in place of the accessing of the main memory when, as the result of the access of the first cache memory, it is determined whether cached data is not present and a fault is present.

* * * * *